US012338654B2

(12) United States Patent
Arbegard

(10) Patent No.: US 12,338,654 B2
(45) Date of Patent: Jun. 24, 2025

(54) BUMPING PREVENTING ARRANGEMENT FOR LOCK DEVICE, LOCK DEVICE AND METHOD

(71) Applicant: ASSA ABLOY AB, Stockholm (SE)

(72) Inventor: Bernt Arbegard, Järfälla (SE)

(73) Assignee: ASSA ABLOY AB, Stockholm (SE)

( * ) Notice: Subject to any disclaimer, the term of this patent is extended or adjusted under 35 U.S.C. 154(b) by 438 days.

(21) Appl. No.: 17/920,130

(22) PCT Filed: Apr. 20, 2021

(86) PCT No.: PCT/EP2021/060194

§ 371 (c)(1),
(2) Date: Oct. 20, 2022

(87) PCT Pub. No.: WO2021/214036

PCT Pub. Date: Oct. 28, 2021

(65) Prior Publication Data

US 2023/0160231 A1 May 25, 2023

(30) Foreign Application Priority Data

Apr. 21, 2020 (SE) .................................... 2050450-2

(51) Int. Cl.
*E05B 27/00* (2006.01)
*E05B 47/00* (2006.01)

(52) U.S. Cl.
CPC ...... *E05B 27/0071* (2013.01); *E05B 27/0017* (2013.01); *E05B 47/0044* (2013.01)

(58) Field of Classification Search
CPC ............. E05B 27/0071; E05B 27/0067; E05B 27/0057; E05B 47/0041; E05B 47/0044; E05B 47/0045; E05B 27/0017
See application file for complete search history.

(56) References Cited

U.S. PATENT DOCUMENTS

| | | | |
|---|---|---|---|
| 4,712,398 A | 12/1987 | Clarkson et al. | |
| 9,567,770 B1 | 2/2017 | Ginos et al. | |

(Continued)

FOREIGN PATENT DOCUMENTS

| | | |
|---|---|---|
| CN | 206801249 | 12/2017 |
| DE | 10353988 | 6/2005 |

(Continued)

OTHER PUBLICATIONS

Communication in Opposition with English Translation for Sweden Patent No. 2050450-2, dated Nov. 30, 2022, 4 pages.

(Continued)

*Primary Examiner* — Kristina R Fulton
*Assistant Examiner* — Faria F Ahmad
(74) *Attorney, Agent, or Firm* — Schwegman Lundberg & Woessner, P.A.

(57) ABSTRACT

A bumping preventing arrangement (10) for a lock device (38, 52, 68), the bumping preventing arrangement (10) comprising transfer member (12, 46, 64, 74) having a magnet (14), the transfer member (12, 46, 64, 74) being movable along an actuation axis (18) between a locked position (16) and an unlocked position (36); a plurality of electric conductors (20), each electric conductor (20) enclosing the actuation axis (18); and a plurality of switches (22), each switch (22) being associated with a respective electric conductor (20), and being arranged to selectively close an electric circuit comprising the associated electric conductor (20) such that eddy currents are induced in the electric conductors (20) when the magnet (14) moves along the actuation axis (18) from the locked position (16) towards the unlocked position (36). A lock device (38, 52, 68) and a method of controlling a lock device (38, 52, 68) are also provided.

15 Claims, 5 Drawing Sheets

(56) References Cited

U.S. PATENT DOCUMENTS

| | | | | |
|---|---|---|---|---|
| 10,030,416 | B1 * | 7/2018 | Albertson | E05B 27/0017 |
| 10,415,269 | B2 * | 9/2019 | Holmes | E05B 27/0071 |
| 11,639,617 | B1 * | 5/2023 | Farber | G07C 9/00174 70/278.7 |
| 2008/0127694 | A1 * | 6/2008 | Wong | E05B 47/0044 70/493 |
| 2008/0211238 | A1 | 9/2008 | Stevens | |
| 2009/0007613 | A1 | 1/2009 | Spycher et al. | |
| 2009/0107195 | A1 | 4/2009 | Gallian | |
| 2009/0173121 | A1 * | 7/2009 | Cheng | E05B 47/0044 70/493 |
| 2010/0077809 | A1 * | 4/2010 | Gerner | E05B 47/063 70/278.2 |
| 2013/0233031 | A1 * | 9/2013 | Maltaverne | E05B 81/54 70/1.5 |
| 2016/0290010 | A1 * | 10/2016 | Ciecha | E05B 47/0045 |
| 2017/0152677 | A1 * | 6/2017 | Klammer | E05B 47/0044 |
| 2018/0334832 | A1 * | 11/2018 | Smyth | E05B 27/005 |

FOREIGN PATENT DOCUMENTS

| | | |
|---|---|---|
| EP | 0709533 | 5/1996 |
| EP | 2816180 | 12/2014 |
| EP | 1930377 | 5/2020 |
| WO | 2021214036 | 10/2021 |

OTHER PUBLICATIONS

Communication in Opposition with English Translation for Sweden Patent No. 2050450-2, dated Dec. 8, 2022, 4 pages.

Official Action for Sweden Patent Application No. 2050450-2, dated Dec. 4, 2020, 33 pages.

Notice of Opposition with English Translation for Sweden Patent No. 2050450-2, dated Sep. 1, 2022, 10 pages.

Communication in Opposition with English Translation for Sweden Patent No. 2050450-2, dated Sep. 14, 2022, 10 pages.

International Search Report and Written Opinion for International (PCT) Patent Application No. PCT/EP2021/060194, dated Jul. 5, 2021, 12 pages.

"International Application Serial No. PCT EP2021 060194, International Preliminary Report on Patentability mailed Nov. 3, 2022", 7 pages.

"CN 202180029614.0 First Office Action with Search Report mailed Sep. 11, 2024", with English translation, 11 pages.

* cited by examiner

BUMPING PREVENTING ARRANGEMENT FOR LOCK DEVICE, LOCK DEVICE AND METHOD

CROSS REFERENCE TO RELATED APPLICATIONS

This application is a national stage application under 35 U.S.C. 371 and claims the benefit of PCT Application No. PCT/EP2021/060194 having an international filing date of Apr. 20, 2021, which designated the United States, which PCT application claimed the benefit of Sweden Patent Application No. 2050450-2 filed Apr. 21, 2020, the disclosure of each of which are incorporated herein by reference.

TECHNICAL FIELD

The present disclosure generally relates to a bumping preventing arrangement. In particular, a bumping preventing arrangement for a lock device, a lock device comprising a bumping preventing arrangement, and a method of controlling a lock device, are provided.

BACKGROUND

Unauthorized manipulation of lock devices by different types of bumping is a well-known problem for key cylinder locks. Also blocking mechanisms for dead bolts and door handles may be subjected to bumping.

In some prior art lock devices, a certain mechanical force "hill" needs to be passed to bump a transfer member from a locked position to an unlocked position to thereby be able to unlock the lock device without authorization. The transfer member may for example be a blocking member or a coupling member. The mechanical force hill may be the force required to overcome a force from a spring that pushes the transfer member towards the locked position.

In those prior art lock devices, the same mechanical force hill for unauthorized unlocking also needs to be overcome for authorized unlocking of the lock device. In the case of a spring pushing the transfer member towards the locked position, the transfer member needs to be moved against the force of the spring also for authorized unlocking. Thus, authorized unlocking often requires a substantial amount of energy to unlock. This is problematic when the transfer member is driven by a motor, and in particular if the lock device is an energy harvesting lock device with a small battery or with no battery at all.

SUMMARY

One object of the present disclosure is to provide a bumping preventing arrangement for a lock device, which bumping preventing arrangement improves security of the lock device.

A further object of the present disclosure is to provide a bumping preventing arrangement for a lock device, which bumping preventing arrangement provides resistance against bumping of the lock device.

A still further object of the present disclosure is to provide a bumping preventing arrangement for a lock device, which bumping preventing arrangement has low power consumption.

A still further object of the present disclosure is to provide a bumping preventing arrangement for a lock device, which bumping preventing arrangement has a compact, simple and/or reliable design.

A still further object of the present disclosure is to provide a bumping preventing arrangement for a lock device, which bumping preventing arrangement has a compact, simple and/or reliable function.

A still further object of the present disclosure is to provide a bumping preventing arrangement for a lock device, which bumping preventing arrangement solves several or all of the foregoing objects in combination.

A still further object of the present disclosure is to provide a lock device comprising a bumping preventing arrangement, which lock device solves one, several or all of the foregoing objects.

A still further object of the present disclosure is to provide a method of controlling a lock device, which method solves one, several or all of the foregoing objects.

According to one aspect, there is provided a bumping preventing arrangement for a lock device, the bumping preventing arrangement comprising a transfer member having a magnet, the transfer member being movable along an actuation axis between a locked position and an unlocked position; a plurality of electric conductors, each electric conductor enclosing the actuation axis; and a plurality of switches, each switch being associated with a respective electric conductor, and being arranged to selectively close an electric circuit comprising the associated electric conductor such that eddy currents are induced in the electric conductors when the magnet moves along the actuation axis from the locked position towards the unlocked position.

The eddy currents generate a magnetic force on the magnet acting against the movement of the magnet. The magnetic force acts as a brake against movements of the transfer member due to bumping.

The transfer member may move relatively easy during authorized unlocking of the lock device when the switches are open due to the absence of the magnetic force. However, for unauthorized opening or bumping when the switches are closed, the transfer member moves relatively heavy due to the induced eddy currents and the consequential counteracting magnetic force.

The bumping preventing arrangement thus enables a particular "unauthorized force hill" and a particular "authorized force hill", lower than the unauthorized force hill, to be set. For example, the unauthorized force hill may be the force needed to overcome both the force of an elastic element and the magnetic force from the eddy currents, and the authorized force hill may be the force needed to overcome only the force of the elastic element. Since the force of an elastic element and the magnetic force can be set as desired, e.g. by corresponding dimensioning of the parts, also the unauthorized force hill and the authorized force hill can be set as desired. In this way, a low authorized force hill and a high unauthorized force hill can be set. This enables a high protection against bumping with a low energy consumption. A wide range of tradeoffs between a very high protection against bumping and a very lower energy consumption can also be realized by means of the bumping preventing arrangement.

The selective closing of the switches can be made with very low power consumption. The bumping preventing arrangement thus provides a low power bumping protection based on the eddy current principle.

When the electric circuits are selectively opened by opening of the switches, no eddy currents are induced in the electric conductors when the magnet moves along the actuation axis from the locked position towards the unlocked position. When the switches are open, the switches are in an unlocked state. This may be referred to as an opening mode.

When the switches are closed to close the electric circuits, the switches are in a locked state. This may be referred to as a protection mode. Each switch may be either electrically or mechanically controlled.

Each electric conductor may partly or entirely enclose the actuation axis. Each electric conductor may have the same, or substantially the same, electrical conductivity. The electric conductors may for example be made of copper, gold or silver. The electrical conductivity of the electric conductors may be at least $3\times10^7$ σ (S/m) at 20° C., such as at least $4\times10^7$ σ (S/m) at 20° C. The bumping preventing arrangement may comprise at least three electric conductors, such as three to six electric conductors.

Due to the cooperation between the electric conductors and the switches to selectively induce eddy currents as a result of movement of the magnet, the bumping preventing arrangement can be miniaturized for various types of lock devices. Thus, the bumping preventing arrangement enables a compact design.

The magnet may be a permanent magnet. The magnet may for example comprise a Neodymium alloy such as a Neodymium-Iron-Boron (NdFeB), or other alloy having a relatively high intrinsic remanence. A relatively high intrinsic coercivity may be used to protect the magnet from being demagnetized by an applied external magnetic field.

The electric conductors may be arranged in a stack. The stack may thus extend parallel with the actuation axis. By arranging the electric conductors in a stack, a tube of electric conductors is formed. A length of the stack along the actuation axis may be larger than a length of the magnet along the actuation axis.

Each electric conductor may extend in a plane substantially perpendicular to, or perpendicular to, the actuation axis. The electric conductors may thus be arranged as, or configured as, a plurality of washers. In this case, each washer may comprise an opening where one of the switches is connected.

The bumping preventing arrangement may further comprise an elastic element arranged to force the transfer member along the actuation axis towards the locked position. The elastic element may for example be a leaf spring or a coil spring.

The transfer member may be constituted by the magnet. Alternatively, the magnet may constitute only a part of the transfer member. That is, the transfer member may comprise the magnet and one or more non-magnetic parts. In any case, the transfer member may be rigid.

The transfer member may be a blocking member. The blocking member may block relative movement between an input member and an output member in the locked position, and unblock relative movement between the input member and the output member in the unlocked position. Thus, in the unlocked position of the blocking member, a movement of the input member is transferred to the output member.

Alternatively, the transfer member may be a coupling member. The coupling member may decouple an input member from an output member in the locked position, and couple the input member to the output member in the unlocked position. Thus, in the unlocked position of the coupling member, a movement of the input member is transferred to output member. The coupling member may thereby function as a clutch.

Each switch may comprise a transistor. The transistor may be controlled by voltage. Alternatively, each switch may be an electromechanical switch or a mechanical switch.

The transistor may be a metal oxide semiconductor field effect transistor, MOSFET, such as N-type metal oxide semiconductor field effect transistor, nMOSFET.

The transistor may be a field effect transistor of the depletion type. The depletion type field effect transistor is normally closed (on). By applying a voltage to the gate, the transistor opens the electric circuit. Depletion type field effect transistors do therefore not consume any power in the locked state. The use of depletion type field effect transistors is therefore advantageous for energy harvesting lock devices which may have limited or no available power in passive mode.

Alternatively, the transistor may be a field effect transistor of the enhancement type. The enhancement type field effect transistor is normally open (off). By applying a voltage to the gate, the transistor closes the electric circuit. Enhancement type field effect transistors do therefore not consume any power in the unlocked state.

The bumping preventing arrangement may further comprise a control system, the control system comprising at least one data processing device and at least one memory having a computer program stored thereon, the computer program comprising program code which, when executed by the at least one data processing device, causes the at least one data processing device to perform the steps of evaluating an authorization request; and commanding each switch to open in response to a granted evaluation of the authorization request. The computer program may further comprise program code which, when executed by the at least one data processing device, causes the at least one data processing device to perform, or command performance of, various steps as described herein.

The control system may further comprise a receiving unit, such as an antenna, for receiving the authorization request. The control system may be configured to determine whether or not authorization should be granted based on the authorization request. If access is granted, e.g. if a valid credential is presented, each switch is commanded to open.

The bumping preventing arrangement may further comprise a printed circuit board, PCB. The control system may be provided on the PCB.

According to a further aspect, there is provided a lock device comprising a bumping preventing arrangement according to the present disclosure. The lock device may comprise an input member and an output member. The output member may be prevented from being moved by movement of the input member when the transfer member is in the locked position. Conversely, the output member may be allowed to be moved by movement of the input member when the transfer member is in the unlocked position.

The lock device may be an energy harvesting lock device. To this end, the lock device may further comprise an electric generator arranged to generate electric energy from movement of the input member. The energy harvesting lock device may not comprise a battery.

According to a further aspect, there is provided a method of controlling a lock device, the method comprising providing a lock device according to the present disclosure; and opening each switch in response to a granted authorization request from a user. If the authorization request is not granted or if no authorization request is received, the each switch remains closed.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
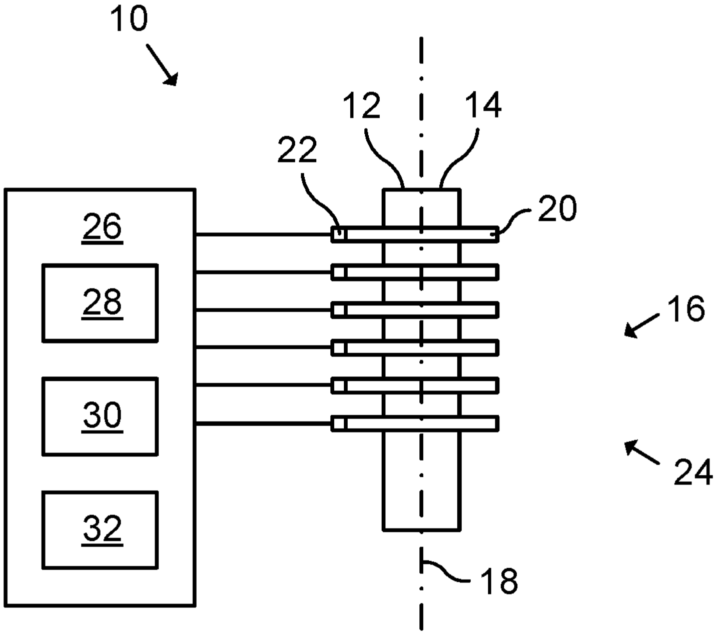
FIG. 1: schematically represents a side view of a bumping preventing arrangement where a transfer member is in a locked position and a plurality of switches are in locked states.

In the following, a bumping preventing arrangement for a lock device, a lock device comprising a bumping preventing arrangement, and a method of controlling a lock device, will be described. The same or similar reference numerals will be used to denote the same or similar structural features.

Figure 2:
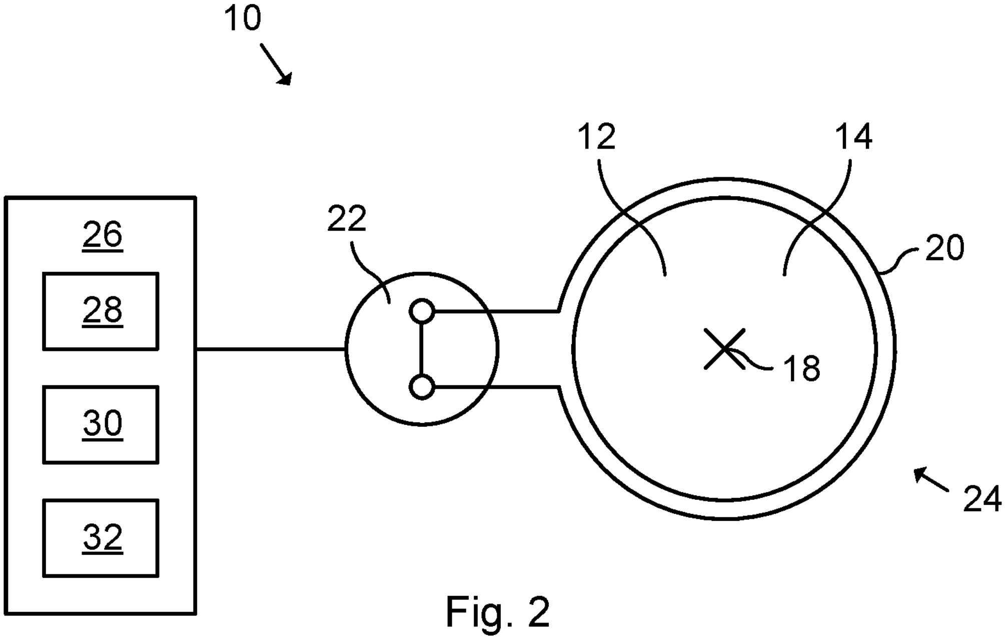
FIG. 2: schematically represents a top view of the bumping preventing arrangement in FIG. 1.

FIG. 1 schematically represents a side view of a bumping preventing arrangement 10 and FIG. 2 schematically represents a top view of the bumping preventing arrangement 10 in FIG. 1. With collective reference to FIGS. 1 and 2, the bumping preventing arrangement 10 comprises a transfer member 12. In this example, the transfer member 12 is constituted by a magnet 14. The magnet 14 of this example is a permanent magnet.

In FIGS. 1 and 2, the transfer member 12 is positioned in a locked position 16. The transfer member 12 is movable from the locked position 16 along an actuation axis 18.

The bumping preventing arrangement 10 further comprises a plurality of electric conductors 20 and a plurality of switches 22. In this specific example, the bumping preventing arrangement 10 comprises six electric conductors 20 and six switches 22. Each electric conductor 20 is associated with one of the switches 22 and each switch 22 is associated with one of the electric conductors 20. Each pair of electric conductor 20 and associated switch 22 encloses the actuation axis 18.

Each electric conductor 20 is arranged in a plane perpendicular to the actuation axis 18 and is shaped as a washer. Each washer comprises a cut-out where the associated switch 22 is positioned. As shown in FIG. 1, the electric conductors 20 are arranged in a stack extending parallel with the actuation axis 18. The electric conductors 20 thereby form a tube enclosing the magnet 14. The electric conductors 20 may be made of copper or another material of high electrical conductivity. The electric conductors 20 may be electrically isolated from each others.

In FIGS. 1 and 2, each individual switch 22 is in a locked state 24. In the locked states 24, each switch 22 is closed such that an electric circuit or current loop comprising the associated electric conductor 20 is closed. Each switch 22 is arranged to selectively close and open the associated electric circuit.

The switches 22 are here exemplified as field effect transistors of the depletion type, i.e. normally closed (on). Thereby, the switches 22 do not consume any power in the locked states 24.

The bumping preventing arrangement 10 further comprises a control system 26. The control system 26 of this example comprises a data processing device 28, a memory 30 and an antenna 32. The memory 30 has a computer program stored thereon. The computer program comprises program code which, when executed by the data processing device 28, causes the data processing device 28 to evaluate an authorization request received by the antenna 32, and to command each switch 22 to open in response to a granted evaluation request. The authorization request may for example be received by the antenna 32 via Bluetooth Low Energy, BLE. Components of the control system 26 may be arranged on a common PCB.

When the switches 22 are in the locked states 24 to short the electric circuits and the transfer member 12 is attempted to be moved from the locked position 16, eddy currents are created in electric conductors 20 by the moving/changing magnetic field of the magnet 14. The eddy currents generate a magnetic force on the magnet 14 acting against the movement of the transfer member 12. In this way, bumping of the transfer member 12 away from the locked position 16 can be prevented.

Figure 3:
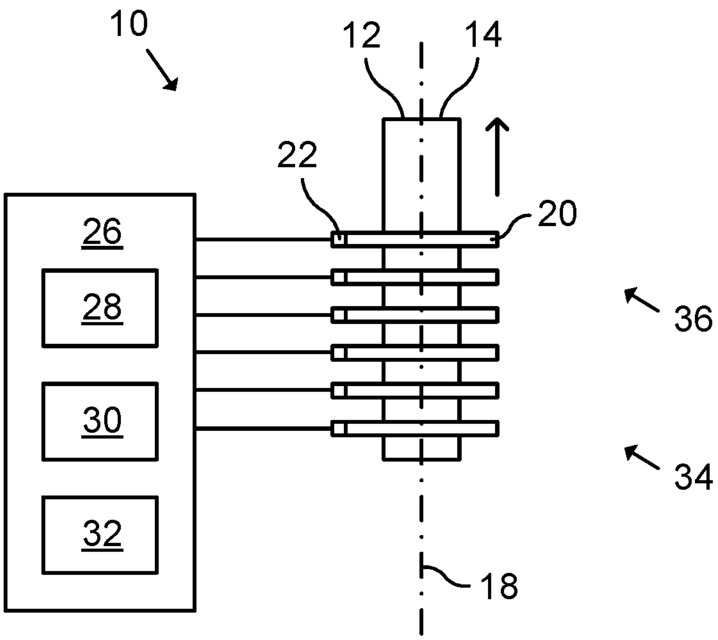
FIG. 3: schematically represents a side view of the bumping preventing arrangement where the transfer member is in an unlocked position and the switches are in unlocked states.
Figure 4:
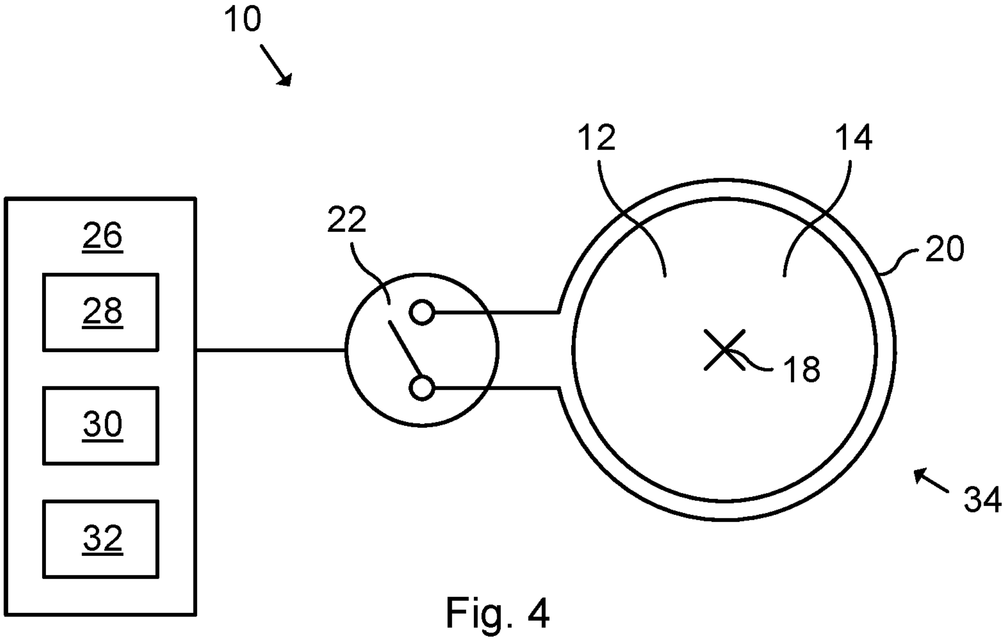
FIG. 4: schematically represents a top view of the bumping preventing arrangement in FIG. 3.

FIG. 3 schematically represents a side view of the bumping preventing arrangement 10 and FIG. 4 schematically represents a top view of the bumping preventing arrangement 10 in FIG. 3. In FIGS. 3 and 4, the switches 22 are in unlocked states 34, e.g. after a user has presented a valid credential. In the unlocked state 34, each switch 22 may consume less than 10 μA, such as less than 2 μA.

When the switches 22 are in the unlocked states 34, each electric circuit around the magnet 14 is open. Consequently, no eddy currents are induced in the electric conductors 20 by movement of the magnet 14 and the magnet 14 is therefore not subjected to any magnetic force from such eddy currents. The transfer member 12 can thereby be moved from the locked position 16 to an unlocked position 36. The switches 22 are thus selectively closed and opened in order to turn on and off, respectively, the eddy currents and the consequential braking magnetic field.

Figure 5:
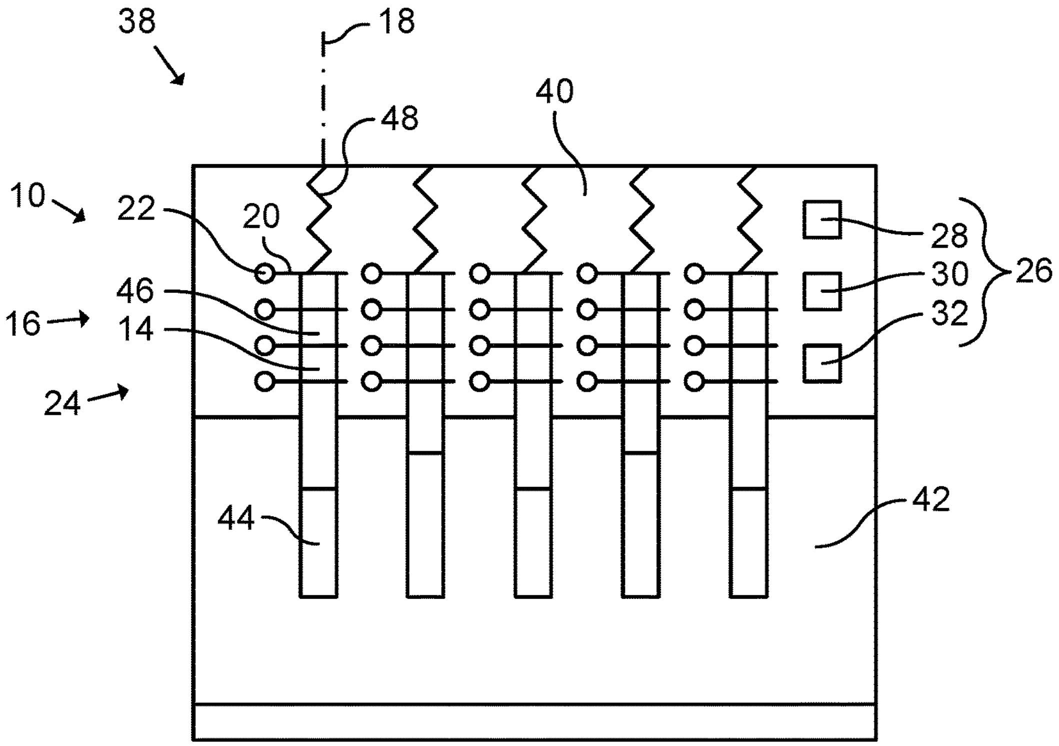
FIG. 5: schematically represents a side view of a key cylinder lock where a plurality of driver pins are in locked positions and the switches are in locked states.

FIG. 5 schematically represents a side view of a key cylinder lock 38. The key cylinder lock 38 comprises an outer casing 40 and a plug 42 rotatably arranged in the outer casing 40. The key cylinder lock 38 further comprises key pins 44, driver pins 46 and compression springs 48. Each driver pin 46 is constituted by a cylindrical magnet 14.

Each spring 48 forces the associated driver pin 46 along an actuation axis 18 into the locked position 16. The springs 48 are examples of elastic elements. The plug 42 is one example of an output member.

The key cylinder lock 38 further comprises a bumping preventing arrangement 10 of the same type as in FIGS. 1-4. Thus, each driver pin 46 is enclosed by a plurality of (four in this example) electric circuits, each formed by an electric conductor 20 and an associated switch 22. Each driver pin 46 is thus one example of a transfer member. As shown in FIG. 5, the bumping preventing arrangement 10 is miniaturized to fit inside the outer casing 40. Also the control system 26 is arranged inside the outer casing 40. The control system 26 controls the switching of all switches 22 associated with the driver pins 46.

In FIG. 5, the driver pins 46 are in locked positions 16 and the switches 22 are in locked states 24. Each driver pin 46 thereby directly blocks a rotational force applied to the plug 42. Should the bumping preventing arrangement 10 not comprise the electric conductors 20, the driver pins 46 would be possible to bump against the compression of the springs 48 by external forces and/or vibrations on the key cylinder lock 38, or with a bump key, to obtain a short unblocked state of the driver pins 46. The key cylinder lock 38 would then be possible to open without authorization. However, by means of the electric conductors 20 and the closing of the switches 22 to close a plurality of electric circuits, eddy currents will be generated by movement of the magnets 14 and the key cylinder lock 38 is therefore much harder or impossible to open using bumping techniques.

In order to bump a driver pin 46 from the locked position 16 to the unlocked position 36, both the force of the spring 48 and the magnetic force generated by eddy currents induced in the electric circuits need to be overcome. A sum of these forces constitutes an unauthorized force hill. Moreover, insertion of a key into the plug 42 will be rather heavy when the electric circuits are closed.

Figure 6:
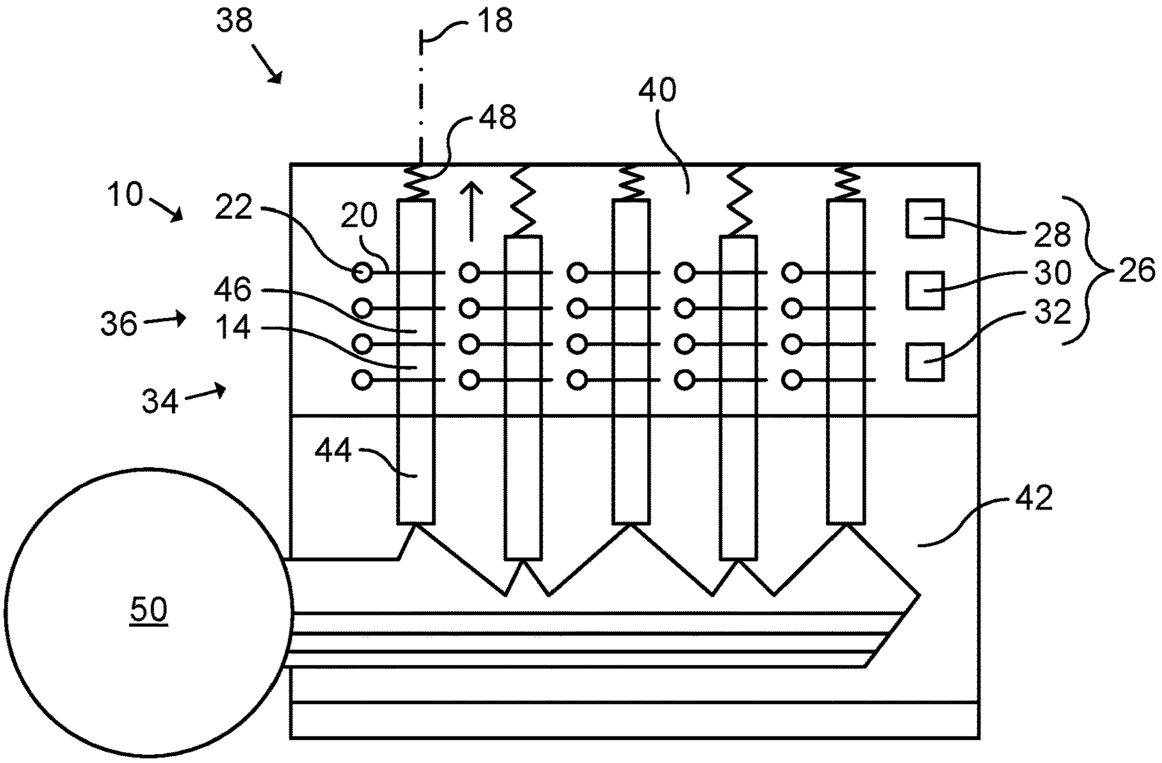
FIG. 6: schematically represents a side view of the key cylinder lock in FIG. 5 where the driver pins are in unlocked positions and the switches are in unlocked states.

FIG. 6 schematically represents a side view of the key cylinder lock 38 in FIG. 5. In FIG. 6, a valid credential has been presented and the control system 26 has thereby commanded the switches 22 to switch from the locked states 24 to the unlocked states 34.

When the switches 22 are in the unlocked states 34, each electric circuit around the respective magnets 14 is open. Consequently, no eddy currents are induced in the electric conductors 20 by movement of the magnets 14 and the magnets 14 are therefore not subjected to any magnetic force from such eddy currents. The driver pins 46 can thereby be moved from the locked position 16 to the unlocked position 36 against the forces of the respective spring 48. The force needed for this movement constitutes an authorized force hill, which is lower than the unauthorized force hill.

As shown in FIG. 6, a key 50 is inserted into the plug 42. The key 50 is one example of an input member. The insertion of the key 50 causes the key pins 44 to move, which in turn causes the driver pins 46 to move from the locked position 16 to the unlocked position 36 along the respective actuation axis 18. The interface between each pair of key pin 44 and driver pin 46 is now aligned with the interface between the plug 42 and the outer casing 40. The plug 42 can thereby be rotated by rotation of the key 50 to open the key cylinder lock 38.

Figure 7:
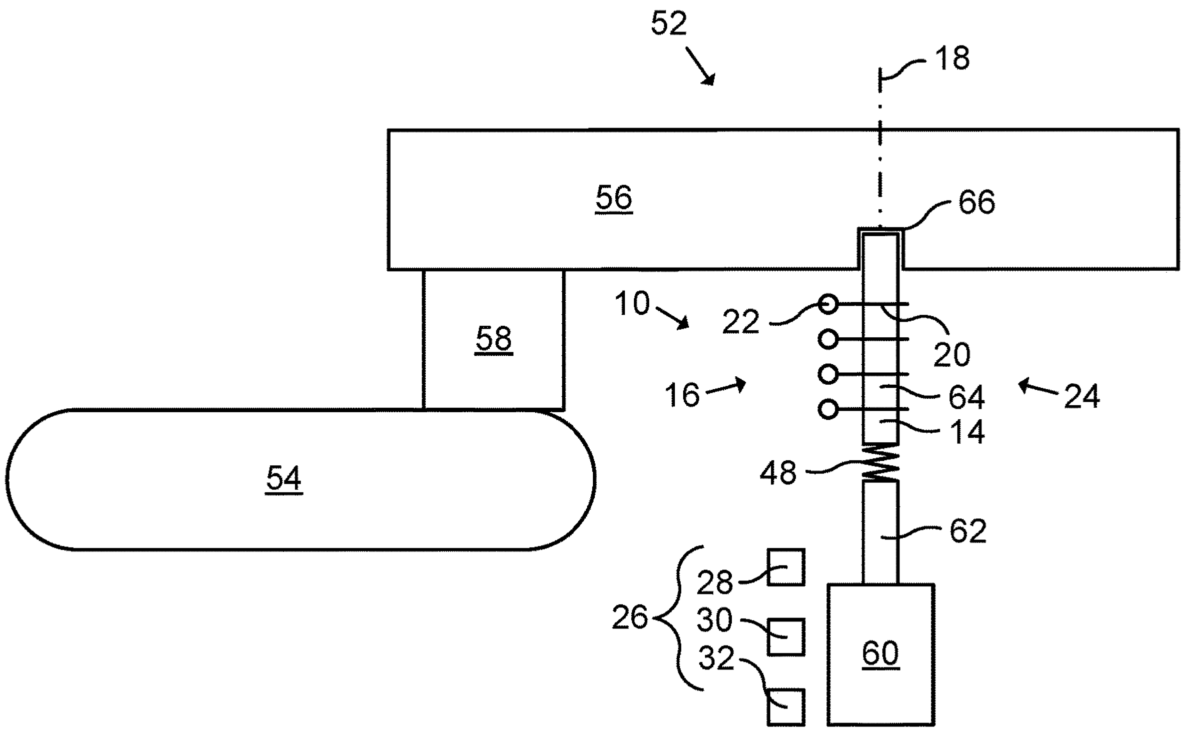
FIG. 7: schematically represents a side view of a further lock device where a blocking member is in a locked position and the switches are in locked states.

FIG. 7 schematically represents a side view of a further lock device 52. The lock device 52 comprises a handle 54 and a latch bolt 56. The handle 54 is a further example of an input member and the latch bolt 56 is a further example of an output member. In this specific example, the handle 54 is arranged to rotate and the latch bolt 56 is arranged to move linearly.

The lock device 52 further comprises a transmission 58. The transmission 58 is configured to transmit a movement of the handle 54 to a movement of the latch bolt 56. To this end, the transmission 58 may for example comprise gear wheels and/or a linkage.

The lock device 52 further comprises an electromechanical actuator 60. The actuator 60 comprises an actuator pin 62. The actuator 60 can move the actuator pin 62 linearly. The actuator 60 is controlled by the control system 26.

The lock device 52 further comprises a blocking member 64 and a spring 48. The spring 48 is arranged between the actuator pin 62 and the blocking member 64. The blocking member 64 is one example of a transfer member. The blocking member 64 is constituted by a magnet 14, here a cylindrical magnet.

The lock device 52 further comprises a bumping preventing arrangement 10 of the same type as in FIGS. 1-6. The bumping preventing arrangement 10 comprises the blocking member 64 constituted by the magnet 14, a plurality of electric conductors 20, a plurality of switches 22, the spring 48 and the control system 26. The blocking member 64 is enclosed by a plurality of electric circuits, each formed by one of the electric conductors 20 and one of the switches 22.

The lock device 52 may be an energy harvesting lock device. In this case, the control system 26 and the actuator 60 are powered by electric energy harvested by mechanical movement of the handle 54.

In FIG. 7, the blocking member 64 is in the locked position 16. In the locked position 16, the blocking member 64 is seated in an aperture 66 in the latch bolt 56. The latch bolt 56 is thereby blocked from moving. The spring 48 forces the blocking member 64 into the locked position 16 seated in the aperture 66.

In FIG. 7, the switches 22 are in locked states 24. Should the bumping preventing arrangement 10 not comprise the electric conductors 20, the blocking member 64 would be possible to bump against the compression of the spring 48 by external forces and/or vibrations on the lock device 52 to obtain a short unblocked state of the blocking member 64. The lock device 52 would then be possible to open without authorization. However, by means of the electric conductors 20 and the closing of the switches 22 to close a plurality of electric circuits, eddy currents will be generated by movement of the magnet 14 and the lock device 52 is therefore much harder or impossible to open using bumping techniques. In order to bump the blocking member 64 from the locked position 16 to the unlocked position 36 when the actuator pin 62 is stationary, both the force of the spring 48 and the magnetic force generated by eddy currents induced in the electric circuits need to be overcome.

Figure 8:
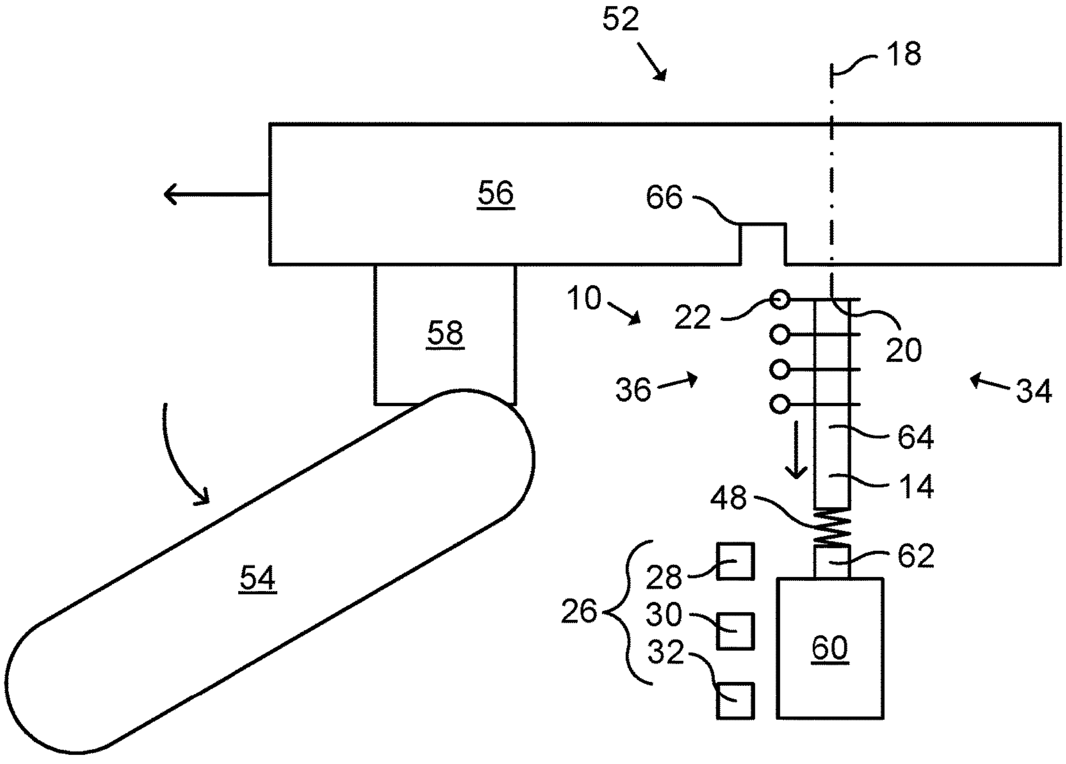
FIG. 8: schematically represents a side view of the lock device in FIG. 7 where the blocking member is in an unlocked position and the switches are in unlocked states.

FIG. 8 schematically represents a side view of the lock device 52 in FIG. 7. In FIG. 8, a valid credential has been presented and the control system 26 has thereby commanded the switches 22 to switch from the locked states 24 to the unlocked states 34.

When the switches 22 are in the unlocked states 34, each electric circuit around the magnet 14 is open. Consequently, no eddy currents are induced in the electric conductors 20 by movement of the magnet 14 and the magnet 14 is therefore not subjected to any magnetic force from such eddy currents. Simultaneously with, or after, the switches 22 are switched to the unlocked states 34, the control system 26 commands the actuator 60 to move the actuator pin 62. As shown in FIG. 8, the actuator pin 62 is retracted. This causes the blocking member 64 to be moved from the locked position 16 to the unlocked position 36 along the actuation axis 18. In the unlocked position 36, the blocking member 64 is retracted completely out from the aperture 66.

The retracting movement of the actuator pin 62 does not need to overcome the force of the spring 48. In fact, since the spring 48 is compressed when the blocking member 64 is in the locked position 16, the spring 48 initially assists the retraction of the actuator pin 62. Thus, a very low authorized force hill is obtained.

In FIGS. 7 and 8, the blocking member 64 blocks relative movement between the handle 54 and the latch bolt 56 in the locked position 16, and unblocks relative movement between the handle 54 and the latch bolt 56 in the unlocked position 36. In the unlocked position 36 of the blocking member 64 in FIG. 8, a rotation of the handle 54 is transferred to a linear movement of the latch bolt 56. The user can now turn the handle 54 to retract the latch bolt 56 to open the lock device 52.

Figure 9:
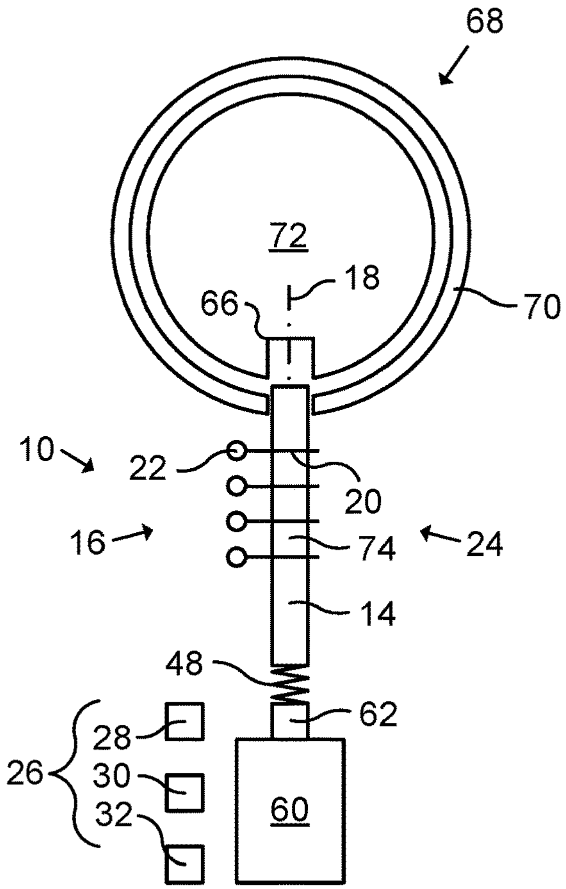
FIG. 9: schematically represents a front view of a further lock device where a coupling member is in a locked position and the switches are in locked states.

FIG. 9 schematically represents a front view of a further lock device 68. The lock device 68 comprises a knob 70 and a locking member 72. The knob 70 is a further example of an input member and the locking member 72 is a further example of an output member. In this specific example, each of the knob 70 and the locking member 72 is arranged to rotate about a common rotation axis.

The lock device 68 further comprises an electromechanical actuator 60 having an actuator pin 62. The actuator 60 and the actuator pin 62 are of the same type as in FIGS. 7 and 8.

The lock device 68 further comprises a coupling member 74 and a spring 48. The spring 48 is arranged between the actuator pin 62 and the coupling member 74. The coupling member 74 is a further example of a transfer member. The coupling member 74 is constituted by a magnet 14, here a cylindrical magnet.

The lock device 68 further comprises a bumping preventing arrangement 10. The bumping preventing arrangement 10 comprises the coupling member 74 constituted by the magnet 14, a plurality of electric conductors 20, a plurality of switches 22, the spring 48 and the control system 26. The coupling member 74 is enclosed by a plurality of electric circuits, each formed by one of the electric conductors 20 and one of the switches 22. It should be emphasized that the lock device 68 in FIG. 9 is merely schematically illustrated. In particular, the bumping preventing arrangement 10 and the actuator 60 may be arranged inside the knob 70.

The lock device 68 may be an energy harvesting lock device. In this case, the control system 26 and the actuator 60 are powered by electric energy harvested by rotation of the knob 70.

In FIG. 9, the coupling member 74 is in the locked position 16. In the locked position 16, the coupling member 74 is retracted from an aperture 66 in the locking member 72. In the locked position 16 of the coupling member 74, a rotation of the knob 70 is not transmitted to a rotation of the locking member 72. The coupling member 74 functions as a clutch. In FIG. 9, the clutch is open.

In FIG. 9, the switches 22 are in locked states 24. Should the bumping preventing arrangement 10 not comprise the electric conductors 20, the coupling member 74 would be possible to bump against the expansion of the spring 48 by external forces and/or vibrations on the lock device 68 to obtain a short coupled state of the coupling member 74. The lock device 68 would then be possible to open without authorization. However, by means of the electric conductors 20 and the closing of the switches 22 to close a plurality of electric circuits, eddy currents will be generated by movement of the magnet 14 and the lock device 68 is therefore much harder or impossible to open using bumping techniques. In order to bump the coupling member 74 from the locked position 16 to the unlocked position 36 when the actuator pin 62 is stationary, both the force of the spring 48 and the magnetic force generated by eddy currents induced in the electric circuits need to be overcome.

Figure 10:
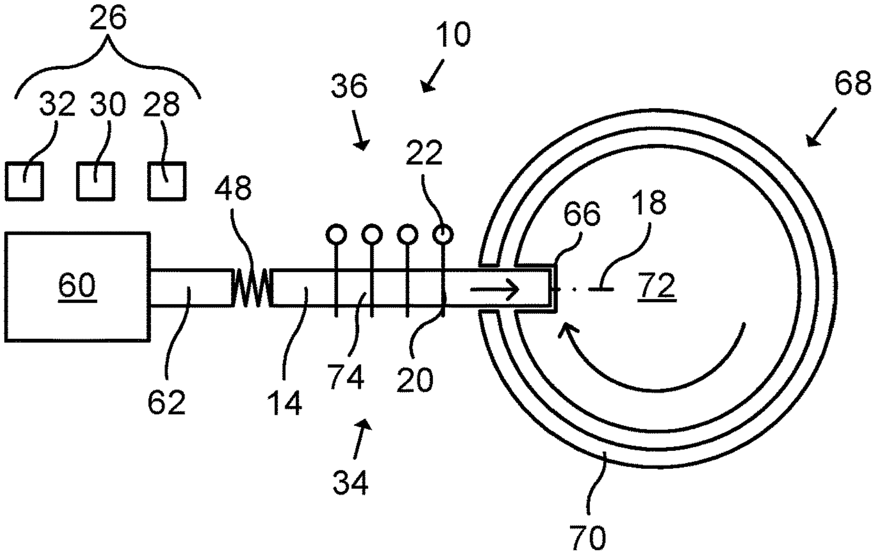
FIG. 10: schematically represents a front view of the lock device in FIG. 9 where the coupling member is in an unlocked position and the switches are in unlocked states.

FIG. 10 schematically represents a front view of the lock device 68 in FIG. 9. In FIG. 10, a valid credential has been presented and the control system 26 has thereby commanded the switches 22 to switch from the locked states 24 to the unlocked states 34.

When the switches 22 are in the unlocked states 34, each electric circuit around the magnet 14 is open. Consequently, no eddy currents are induced in the electric conductors 20 by movement of the magnet 14 and the magnet 14 is therefore not subjected to any magnetic force from such eddy currents. Simultaneously with, or after, the switches 22 are switched to the unlocked states 34, the control system 26 commands the actuator 60 to move the actuator pin 62. As shown in FIG. 10, the actuator pin 62 is extended. This causes the coupling member 74 to be moved from the locked position 16 to the unlocked position 36 along the actuation axis 18. In the unlocked position 36, the coupling member 74 is seated in the aperture 66 in the locking member 72. The extending movement of the actuator pin 62 does not need to overcome the force of the spring 48. In FIG. 10, the clutch is closed.

In FIGS. 9 and 10, the coupling member 74 decouples the knob 70 from the locking member 72 in the locked position 16, and couples the knob 70 to the locking member 72 in the unlocked position 36. Thus, in the unlocked position 36 of the coupling member 74, the knob 70 and the locking member 72 can be rotated in common to unlock the lock device 68. Although the bumping preventing arrangement 10 comprising a coupling member 74 is exemplified together with the lock device 68 comprising the knob 70 in FIGS. 9 and 10, the bumping preventing arrangement 10 comprising a coupling member 74 can be used with other types of lock devices not necessarily comprising a knob.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. A bumping preventing arrangement for a lock device, the bumping preventing arrangement comprising:
- a transfer member having a magnet, the transfer member being movable along an actuation axis between a locked position and an unlocked position;
- a plurality of electric conductors, each electric conductor enclosing the actuation axis; and
- a plurality of switches, each switch being associated with a respective electric conductor, and being arranged to selectively close an electric circuit comprising the respective electric conductor such that eddy currents are induced in the plurality of electric conductors when the magnet moves along the actuation axis from the locked position towards the unlocked position.

2. The bumping preventing arrangement according to claim 1, wherein the plurality of electric conductors are arranged in a stack.

3. The bumping preventing arrangement according to claim 2, wherein a length of the stack along the actuation axis is larger than a length of the magnet along the actuation axis.

4. The bumping preventing arrangement according to claim 1, wherein each electric conductor extends in a plane substantially perpendicular to the actuation axis.

5. The bumping preventing arrangement according to claim 1, further comprising an elastic element arranged to force the transfer member along the actuation axis towards the locked position.

6. The bumping preventing arrangement according to claim 1, wherein the transfer member is constituted by the magnet.

7. The bumping preventing arrangement according to claim 1, wherein the transfer member is a blocking member.

8. The bumping preventing arrangement according to claim 1, wherein the transfer member is a coupling member.

9. The bumping preventing arrangement according to claim 1, wherein each switch comprises a transistor.

10. The bumping preventing arrangement according to claim 9, wherein each transistor is a metal oxide semiconductor field effect transistor, MOSFET.

11. The bumping preventing arrangement according to claim 9, wherein each transistor is a field effect transistor of the depletion type.

12. The bumping preventing arrangement according to claim 9, wherein each transistor is a field effect transistor of the enhancement type.

13. The bumping preventing arrangement according to claim 1, further comprising a control system, the control system comprising at least one data processing device and at least one memory having a computer program stored thereon, the computer program comprising program code which, when executed by the at least one data processing device, causes the at least one data processing device to perform the steps of:

evaluating an authorization request; and commanding each switch to open in response to a granted evaluation of the authorization request.

14. A lock device comprising a bumping preventing arrangement according to claim 1.

15. A method of controlling a lock device, the method comprising:

providing a lock device according to claim 14; and opening each switch in response to a granted authorization request from a user.

* * * * *